US010388058B2

United States Patent
Goossen et al.

(10) Patent No.: US 10,388,058 B2
(45) Date of Patent: Aug. 20, 2019

(54) TEXTURE RESIDENCY HARDWARE ENHANCEMENTS FOR GRAPHICS PROCESSORS

(71) Applicant: Microsoft Technology Licensing, LLC, Redmond, WA (US)

(72) Inventors: James Andrew Goossen, Sammamish, WA (US); Matthew William Lee, Sammamish, WA (US); Mark S. Grossman, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 15/608,003

(22) Filed: May 30, 2017

(65) Prior Publication Data

US 2018/0232940 A1 Aug. 16, 2018

Related U.S. Application Data

(60) Provisional application No. 62/459,726, filed on Feb. 16, 2017.

(51) Int. Cl.
*G06T 15/04* (2011.01)
*G06T 15/00* (2011.01)
*G06T 15/50* (2011.01)

(52) U.S. Cl.
CPC ............ *G06T 15/04* (2013.01); *G06T 15/005* (2013.01); *G06T 15/503* (2013.01); *G06T 2200/28* (2013.01); *G06T 2210/36* (2013.01)

(58) Field of Classification Search
None
See application file for complete search history.

(56) References Cited

U.S. PATENT DOCUMENTS

| 6,707,458 | B1 * | 3/2004 | Leather ................. G06T 15/04 345/582 |
| 7,193,627 | B1 * | 3/2007 | Donovan ............... G06T 15/04 345/428 |
| 8,587,602 | B2 | 11/2013 | Grossman et al. |
| 2008/0106552 | A1 | 5/2008 | Everitt |
| 2011/0157205 | A1 | 6/2011 | Tao et al. |
| 2011/0157206 | A1 * | 6/2011 | Duluk, Jr. ............. G06T 15/04 345/582 |
| 2011/0157207 | A1 | 6/2011 | Hall et al. |
| 2015/0089146 | A1 | 3/2015 | Gotwalt et al. |
| 2015/0379730 | A1 | 12/2015 | Tsakok et al. |

OTHER PUBLICATIONS

Harrison, et al., "AES Encryption Implementation and Analysis on Commodity Graphics Processing Units", In proceedings of the international Workshop on Cryptographic Hardware and Embedded Systems, Published on: Sep. 10, 2007, 10 pages.

* cited by examiner

*Primary Examiner* — Edward Martello

(57) ABSTRACT

Systems, methods, apparatuses, and software for graphics processing systems in computing environments are provided herein. In one example, a method of handling tiled resources in graphics processing environments is presented. The method includes establishing, in a graphics processing unit, a residency map having values determined from memory residency properties of a texture resource, and sampling from the residency map at a specified location to determine a residency map sample for the texture resource at the specified location, where the residency map sample indicates at least an initial level of detail presently resident and a smoothing component to reach a next level of detail.

20 Claims, 9 Drawing Sheets

TEXTURE RESIDENCY HARDWARE ENHANCEMENTS FOR GRAPHICS PROCESSORS

RELATED APPLICATIONS

This application hereby claims the benefit of and priority to U.S. Provisional Patent Application 62/459,726, titled "TEXTURE RESIDENCY HARDWARE ENHANCEMENTS FOR GRAPHICS PROCESSORS," filed Feb. 16, 2017, which is hereby incorporated by reference in its entirety.

BACKGROUND

Computing systems, such as personal computers, portable computing platforms, gaming systems, and servers, can include graphics processors along with main/central processors. These graphics processors, sometimes referred to as graphics processing units (GPUs), can be integrated into the central processors or discretely provided on separate add-in cards, among other configurations. User applications, operating systems, video games, or other software elements can interface with GPUs using various application programming interfaces (APIs) that allow for standardized software/logical interfaces between the software elements and various GPU hardware elements.

Most GPUs can render both two-dimensional (2D) and three-dimensional (3D) graphics data for display, such as graphics data from operating systems, productivity applications, entertainment media, scientific analysis, gaming software, or other graphics data sources. Within the GPUs, various internal stages can process graphics data into rendered images for display on a suitable display device. In many GPUs, these internal stages comprise a graphics pipeline that can take representations of scenes or user interfaces and render these into images for output to various display devices. Among these GPU stages are texture mapping stages that provide graphical details, surface textures, colors, or other elements for portions of rendered images. Texture maps are typically applied to surfaces of shapes within 3D data, and this combination is rendered as a 2D image for output to display devices.

Overview

Systems, methods, apparatuses, and software for graphics processing systems in computing environments are provided herein. In one example, a method of handling tiled resources in graphics processing environments is presented. The method includes establishing, in a graphics processing unit, a residency map having values determined from memory residency properties of a texture resource, and sampling from the residency map at a specified location to determine a residency map sample for the texture resource at the specified location, where the residency map sample indicates at least an initial level of detail presently resident and a smoothing component to reach a next level of detail.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
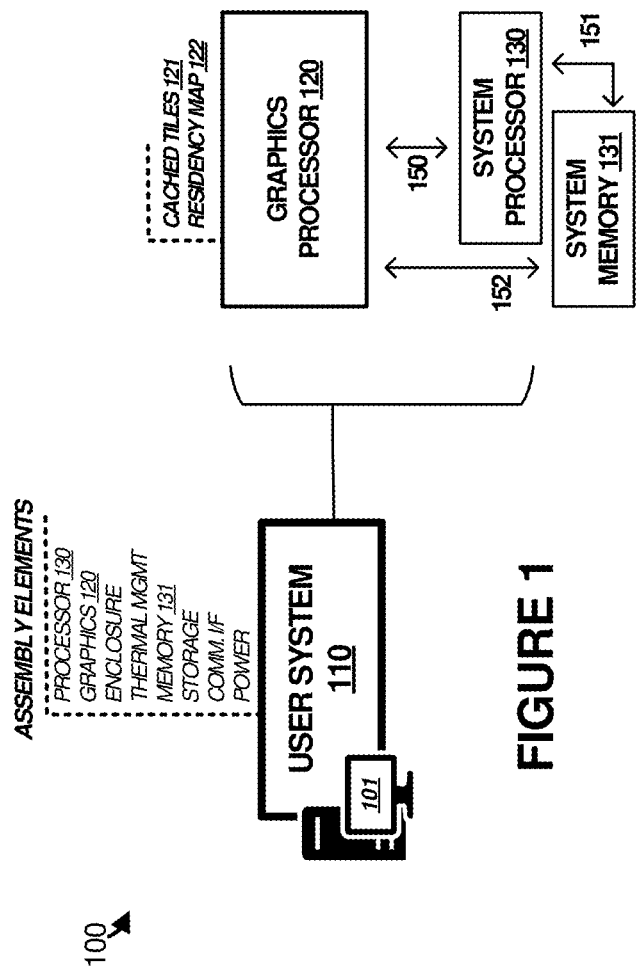
FIG. 1 illustrates a graphics processing environment in an implementation.

Graphics processing units (GPUs) include various internal hardware components, such as processing stages, memory elements, and other pipelined processing elements. User content that is rendered by GPUs, such as video game content, is expected to continue growing in complexity over time, but graphics hardware constraints such as bandwidth and memory capacity are not expected to grow at a similar rate. The techniques discussed herein provide improved efficiency in usage of residency maps for GPUs. The layout of the residency maps herein provides for viable hardware implementations, leading to faster and more efficient rendering of graphics for computing systems.

GPUs and associated support software can render 3D graphics, in some examples, by applying 'texture' data to target objects within a 3D space rendered to a user. Texture data provide surface details, surface graphics, texturing, or other surface features to represent objects with desired surface details. Elements of software or the GPU can 'map' the texture data onto the objects, such as by determining relationships among geometric coordinates of the texture data and the objects. In many examples, the texture data comprises 2D image data that is mapped onto the surfaces of a 3D object formed from discrete triangles/polygons. This mapping process can be processor-intensive and require large amounts of memory to accomplish. Moreover, several functions of the mapping process might be included software that drives the GPU instead of hardware of the GPU itself, due in part to complexity and the amount of data that is usually manipulated.

To aid in the memory-intensive nature of the texture mapping process, partially resident textures (PRTs) have been developed. These PRTs partially map texture data only to portions of objects presently needed to be rendered, such as due to viewpoint characteristics of a user, obstruction by other objects, proximity to a viewer, or other factors. Mip mapping can also be included in this process to pre-compute a series or set of smaller and smaller texture representations to suit different levels of detail for the textures. This mip mapping can aid in anti-aliasing as well as provide less processor-intensive renderings.

Migrating elements of texture streaming implementations from mip-based streaming (i.e. loading entire levels of detail) to tile-based streaming and partial residency can be an effective mitigation to performance issues. Techniques using partial residency can allow content complexity to continue to grow without a corresponding increase in load times or memory footprint. Tiled resources (also known as partially resident textures or PRTs) can be improved so that these PRTs can be widely adopted while minimizing implementation difficulty and performance overhead for GPUs. These improvements include hardware residency map features and texture sample operations referred to herein as "residency samples," among other improvements.

A first enhancement includes a hardware residency map feature comprising a low-resolution residency map that is paired with a much larger PRT, and both are provided to hardware at the same time. The residency map stores the mipmap level of detail resident for each rectangular region of the texture. PRT textures are currently difficult to sample given sparse residency. Software-only residency map solutions typically perform two fetches of two different buffers in the shader, namely the residency map and the actual texture map. The primary PRT texture sample is dependent on the results of a residency map sample. These solutions are effective, but require considerable implementation changes to shader and application code, especially to perform filtering the residency map in order to mask unsightly transitions between levels of detail, and may have undesirable performance characteristics. The improvements herein can streamline the concept of a residency map and move the residency map into a hardware implementation.

A second enhancement includes an enhanced type of texture sample operation called a "residency sample." The residency sample operates similarly to a traditional texture sampling, except the part of the texture sample that requests texture data from cache/memory and filters the texture data to provide an output value is removed from the residency sample operation. The purpose of the residency sample is to generate memory addresses that reach the page table hardware in the graphics processor but do not continue on to become full memory requests. Instead, the residency of the PRT at those addresses is checked and missing pages are non-redundantly logged and requested to be filled by the OS or a delegate.

Turning now to an example systems and platforms that can provide at least the above enhancements, FIG. 1 is provided. FIG. 1 illustrates graphics processing environment 100 in an implementation. Environment 100 includes user system 110, graphics processor 120, and system processor 130. In operation, system processor 130 can boot into an operating system (OS) to provide various operations of user system 110 including user applications, communication services, storage services, gaming services, or other features of a computing system. Graphics processor 120 can provide graphics processing and rendering services for system processor 130. Graphics processor 120 also provides enhanced operations including operations involving cached tiles 121 and residency map 122, as will be discussed below. Although graphics processor 120 is shown as a separate element that communicates over at least link 150 with processor 120 in FIG. 1, it should be understood that other examples can provide graphics processor 120 within system processor 130, such as when system processor 130 integrates elements of graphics processor 120.

User system 110 comprises a computing system or computing assembly, such as a computer, server, tablet device, laptop computer, smartphone, gaming system, entertainment system, storage system, or other computing system, including combinations thereof. User system 110 includes several components detailed in FIG. 1. These components include graphics processor 120 and system processor 130, as mentioned above. Graphics processor 120 and system processor 130 can each comprise one or more integrated elements, such as processor cores, cache memory, communication interfaces, graphics cores, and north bridge elements, among other integrated elements not shown for clarity. Furthermore, user system 110 can include various assembly elements, such as enclosure elements, thermal management elements, memory elements, storage elements, communication interfaces, power system elements, among other elements not shown for clarity. When graphics processor 120 and system processor 130 are installed in user system 110, these assembly elements provide system resources and context for the operation of system processor 130. Display 101 can be included with user system 110.

Enclosure elements can include structural support elements, cases, chassis elements, or other elements that house and structurally support the further elements of user system 110. Thermal management elements can include heatsinks, fans, heat pipes, heat pumps, refrigeration elements, or other elements to manage and control temperature of user system 110. Memory elements can comprise random-access memory (RAM), cache memory devices, or other volatile memory elements employed by system processor 130 or graphics processor 120. Storage elements comprise non-volatile memory elements, such as hard disk drives (HDDs), flash memory devices, solid state drives (SSDs), or other memory devices which store operating systems, applications, or other software or firmware for user system 110. Communication interfaces can include network interfaces, peripheral interfaces, storage interfaces, audio/video interfaces, or others which communicatively couple user system to external systems and devices. Graphics elements can include display interfaces, displays, touchscreens, touch interfaces, user interfaces, among others. Power system elements typically include voltage regulator circuitry, controller circuitry, power filtering elements, power conditioning elements, power conversion elements, power electronics elements, or other power handling and regulation elements. Power system elements receive power from an external source, such as from batteries or an external power source, and converts/regulates the power to produce voltages and currents to operate the elements of user system 110.

User system 110 can communicate over one or more communication links comprising one or more network links. Example communication links can use metal, glass, optical, air, space, or some other material as the transport media. Example communication links can use various communication interfaces and protocols, such as Internet Protocol (IP), Ethernet, USB, Thunderbolt, Bluetooth, IEEE 802.11 WiFi, or other communication signaling or communication formats, including combinations, improvements, or variations thereof. Communication links can be direct links or may include intermediate networks, systems, or devices, and can include a logical network link transported over multiple physical links.

User system 110 can include software such as an operating system, logs, databases, utilities, drivers, networking software, user applications, gaming applications, and other software stored on a computer-readable medium. Software of user system 110 can comprise one or more platforms which are hosted by a distributed computing system or cloud-computing service. Software of user system 110 can comprise logical interface elements, such as software defined interfaces and Application Programming Interfaces (APIs). Software of user system 110 can be used to generate data to be rendered by graphics processor 120 and control the operation of graphics processor 120 to render the graphics for output to one or more display devices.

Graphics processor 120, system processor 130, and system memory 131 can communicate over associated links 150-152. Example links can use metal, glass, optical, air, space, or some other material as the transport media. The links can use various communication protocols and communication signaling, such as computer busses, including combinations or variations thereof. The links can be direct links or may include intermediate networks, systems, or devices, and can include a logical network link transported over multiple physical links.

System memory 131 typically comprises any physical or virtual allotment of random access memory (RAM) or dynamic RAM, among other components, including interfacing elements. System memory 131 can be shared among system processor 130 and graphics processor 120, or partitioned to be exclusive to either system processor 130 and graphics processor 120.

Figure 2:
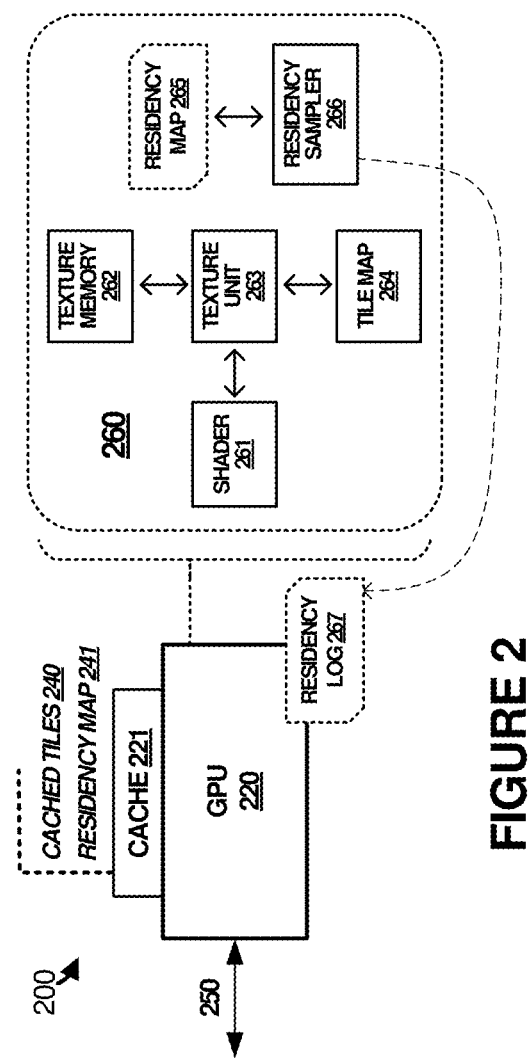
FIG. 2 illustrates a graphics processor in an implementation.

FIG. 2 illustrates graphics processing system 200 in an implementation. System 200 includes graphics processor 220 which further includes hardware cache 221. Graphics processor 220 can be an example of graphics processor 120, although variations are possible. Graphics processor 220 can provide graphics processing and rendering services for a system processor that indicates data and instructions over link 250, such as system processor 130 in FIG. 1. Cache 221 comprises a memory or storage area incorporated into graphics processor 220 for storing usage-based data and components for graphics processor 220. Cache 221 can store cached tiles 240 and residency map 241, among other items. In some examples, cache 221 comprises a hardware-based cache memory in the hardware components that from graphics processor 220, such as on-die cache memory.

As mentioned above, graphics processor 220 can include one or more stages or internal components that can process content/data into rendered images for display. These elements can include those shown in FIG. 1 for graphics processing unit (GPU) elements 260, although it should be understood that other configurations are possible. Elements 260 include shader 261, texture memory 262, texture unit 263, tile map 264, residency map 241, and residency sampler 266.

Texture memory 262 can include texture data that is provided by a content source for use by graphics processor 220. Texture memory 262 can serve as a tile cache that stores tiles for associated partially resident textures that are employed in rendering. Tiles can be any discrete unit/region of a texture map. Cached tiles 240 are included in FIG. 2 representative of one or more resident portions of texture data within a cache portion of graphics processor 220. Shader 261 determines color information during the rendering process, and in some examples comprises pixel shading features. Shader 261 can communicate with texture unit 263 to determine colors/shading for regions of textures, which can be referred to as texels. Shader 261 can indicate level of detail (LOD) thresholds to texture unit 263, which is used for associated tile handling processes. The LOD thresholds can include a detail level needed for a particular tile, which can be based on various factors, including 3D-viewability factors. LOD will be discussed in more detail below.

Tile map 264 specifies what tiles and detail levels are stored in texture memory 262, and can comprise one or more tables or other data structures to track the information in texture memory 262. Values in tile map 264 indicate integers corresponding to levels of detail that are resident in texture memory 262. Tile map 264 may optionally be implemented as a cache that is filled with contents from an area of texture memory 262.

Residency map 241 comprises a buffer in memory that exists alongside tiled resources referred to as PRT (partially-resident textures). Residency map 241 indicates a combined "A.B" representation of a mipmap level of detail resident in texture memory 262 ("A") along with a fractional value employed in a filtering clamp ("B"). The residency map is provided to graphics processor 220 along with the PRT in the same "descriptor," with the PRT being the primary data source and the residency map being the secondary "metadata" data source. The residency map is a relatively compact data structure that represents one data sample per (u,v) rectangular region of the PRT, and can be held in entirely hardware—such as cache 221. Each data sample in the residency map can represent predetermined region of the PRT, such as a rectangular region of the PRT.

Residency sampler 266 comprises logic that performs a sample from residency map 241. Residency sampler 266 generates memory addresses that reach the page table hardware in graphics processor 220, but do not continue on to become full memory requests. Instead, the residency of the PRT at those addresses is checked and recorded in residency log 267. Residency log 267 can be read by a designated entity so that unused pages in texture memory 262 can be discarded and missing pages in texture memory 262 are filled.

Figure 3:
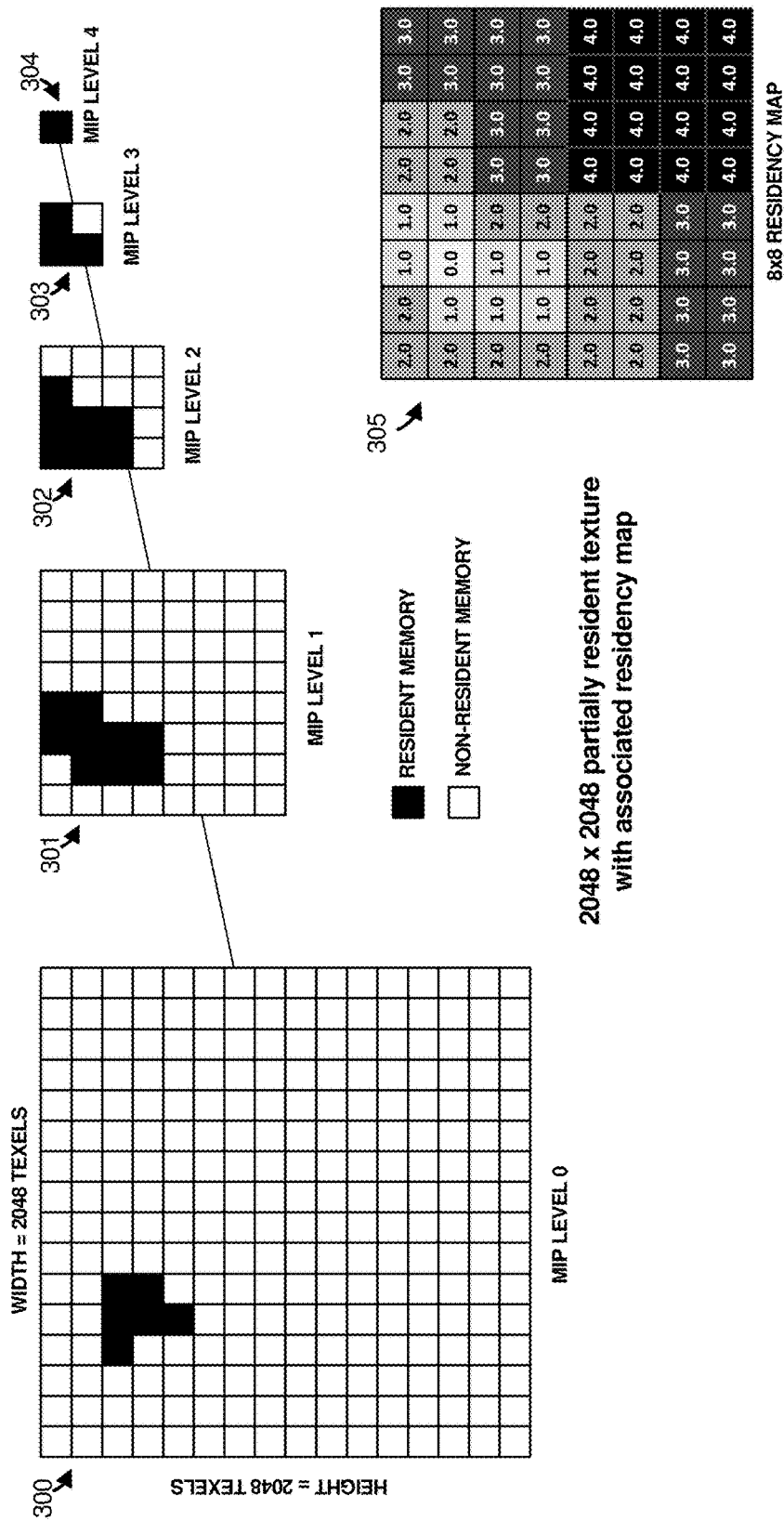
FIG. 3 illustrates an example texture information and residency map in an implementation.

FIG. 3 is provided to highlight example operations of elements of FIGS. 1-2. In FIG. 3, shows several precomputed texture renderings at different detail levels, namely renderings 300-304. Each rendering corresponds to texture data that covers the same quantity of texels (i.e. 2048×2048 texels), and each square corresponds to the same or similar quantity of memory for texture data. Thus, each successive rendering covers the same number of texels, but in a successively lower level of detail. Further texture mapping processes can use a selected level of detail to map to an object depending on visibility, distance, or other scene-driven factors. Each black square in renderings 300-304 indicates a portion that is currently 'resident' or available for texture mapping.

The detail levels of renderings 300-304 corresponds to a different 'mip' level (derived from the Latin phase multum in parvo). Renderings 300-304 comprise a set, with each member mapping to coordinates of a target object for which an associated texture is applied. Thus, renderings 300-304 can comprise a 'mipmap' or 'pyramid' that is pre-calculated with progressively lower resolution representations of the same texture.

Residency map 305 is also shown in FIG. 3, and samples are made from residency map 305 to determine which mip level is currently available. When the graphics processor samples from the PRT, it would first sample from the residency map. For example, for a given region of residency map 305, a sample indicates the lowest mip level resident in the pre-computed renderings 300-305. Further texture mapping processes can then use this minimum available mip level in level-of-detail ("LOD") considerations. The result of the residency map sample is a LOD value that is used to clamp LOD calculations used for the subsequent sample of the PRT. This new LOD clamp would be applied in conjunction with existing LOD clamps specified by the resource descriptor, sampler descriptor, and optional per-pixel input value from the shader. LOD bias calculations should be applied before clamping.

Residency map 305 is a relatively small data structure that represents one data sample per (u,v) rectangular region of the PRT. Only one two-dimensional plane of residency map is required for each two-dimensional array slice of a PRT, regardless of the mip dimensions of the PRT. The memory footprint of residency map 305 is kept small so that the residency map remains within cache memory and can be quickly prefetched into cache if necessary. Each residency map data sample is one byte, encoded with a fixed-point representation such as (4-bits).(4-bits) that accommodates encoding of a 0-15 fractional LOD value for LOD clamping. A one byte fixed-point representation (e.g. 4.4 above, among other representations) can be stored in the residency map, with a 4-bit integer portion and a 4-bit fractional portion delimited by a binary radix point.

A typical residency map is sized along the lines of 64-256 bytes per array slice of the PRT, which would be 8×8 or 16×16 entries, respectively. The size of the residency map can also be made configurable, as a variable power-of-2 division of the X-Y dimensions of the PRT. If configurable, a developer would be responsible for ensuring the residency map size remains suitable to reside in a hardware cache. Other encodings could be used for the residency map values, such as a higher precision delta value encoded in the residency map which is added to a PRT-global base value. The residency map can be sized proportional to a texture resource size using a scaling factor, such as having $2^n$ values in a residency map for a particular texture resource size, where "n" corresponds to a predetermined number. For example, a U×V sized texture resource (e.g. 2048×2048) could produce n=U/128 or n=U/256 (or n=2048/128 in the 2048×2048 example).

The layout of residency map samples can be linear (such as an array of strided rows) corresponding with geographic layout in (u,v) space. Linear layout is efficient for application code to manipulate, and when the residency map is small enough, then linear layout has less impact on cache coherency.

Each data sample in the residency map represents a rectangular region of the PRT, as mentioned above. The value of that data sample represents the lowest mip level that is fully resident within that region, where 0 is the base (largest) mip level, and larger numbers represent successively smaller mip levels. The fractional component is present in order to smoothly transition the value from one whole number to the next. For example, if a fractional value is employed, then mip levels corresponding to the integer value and the next higher mip level, such that an A.B fractional value would indicate that mip levels A and A+1 are resident. A filtering process can be employed to determine information between adjacent samples of residency map 305.

Advantageously, due in part to residency map 305 being small and granular, residency map 305 can be fully implemented into hardware components of graphics processor 120. This has the technical effects of faster, more efficient operation of graphics processors, the ability to hold enhanced residency maps in hardware, and reduced computing resource required to properly render texture data for objects in rendered scenes.

Figure 4:
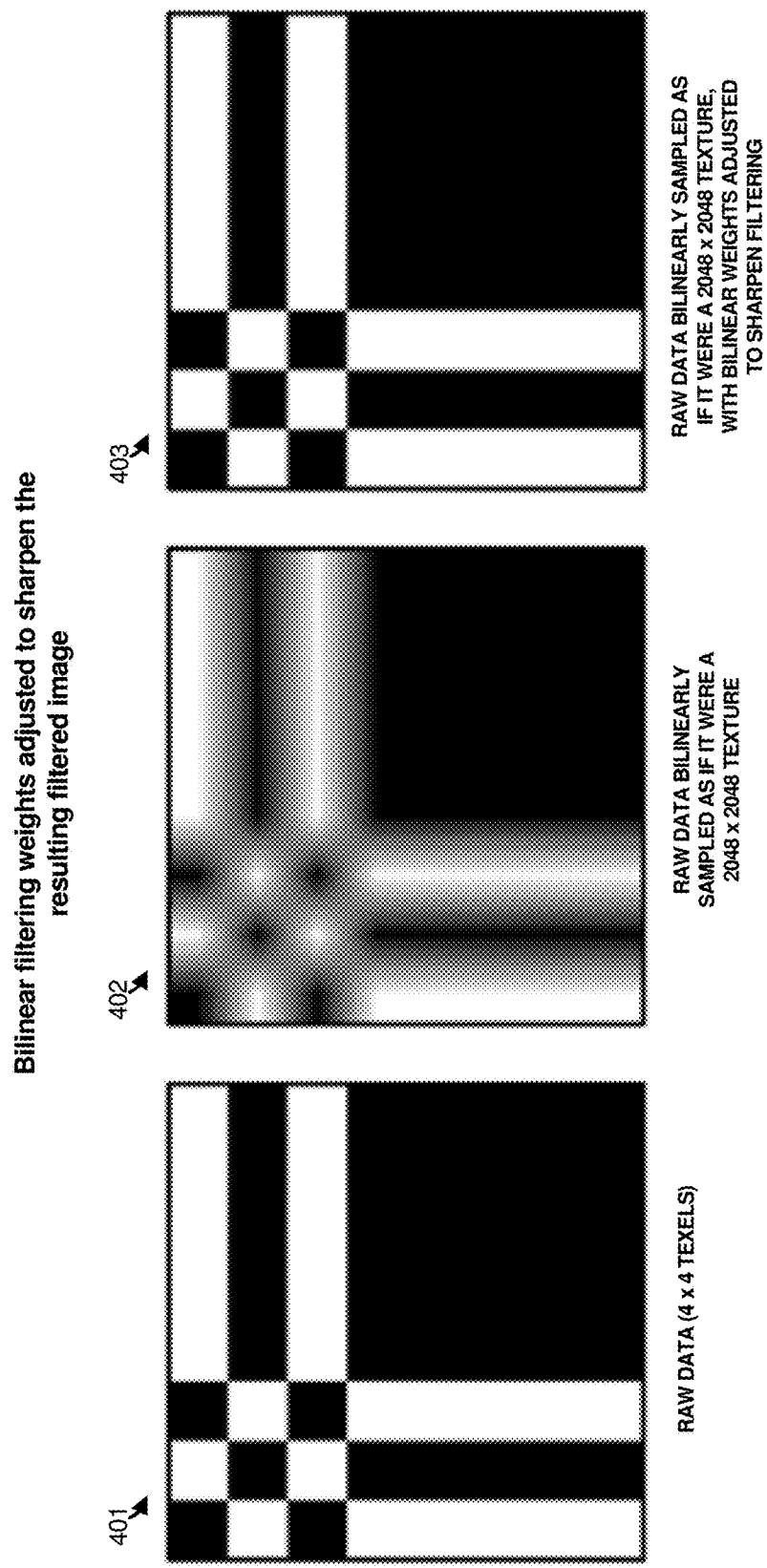
FIG. 4 illustrates an example filtering in an implementation.
Figure 5:
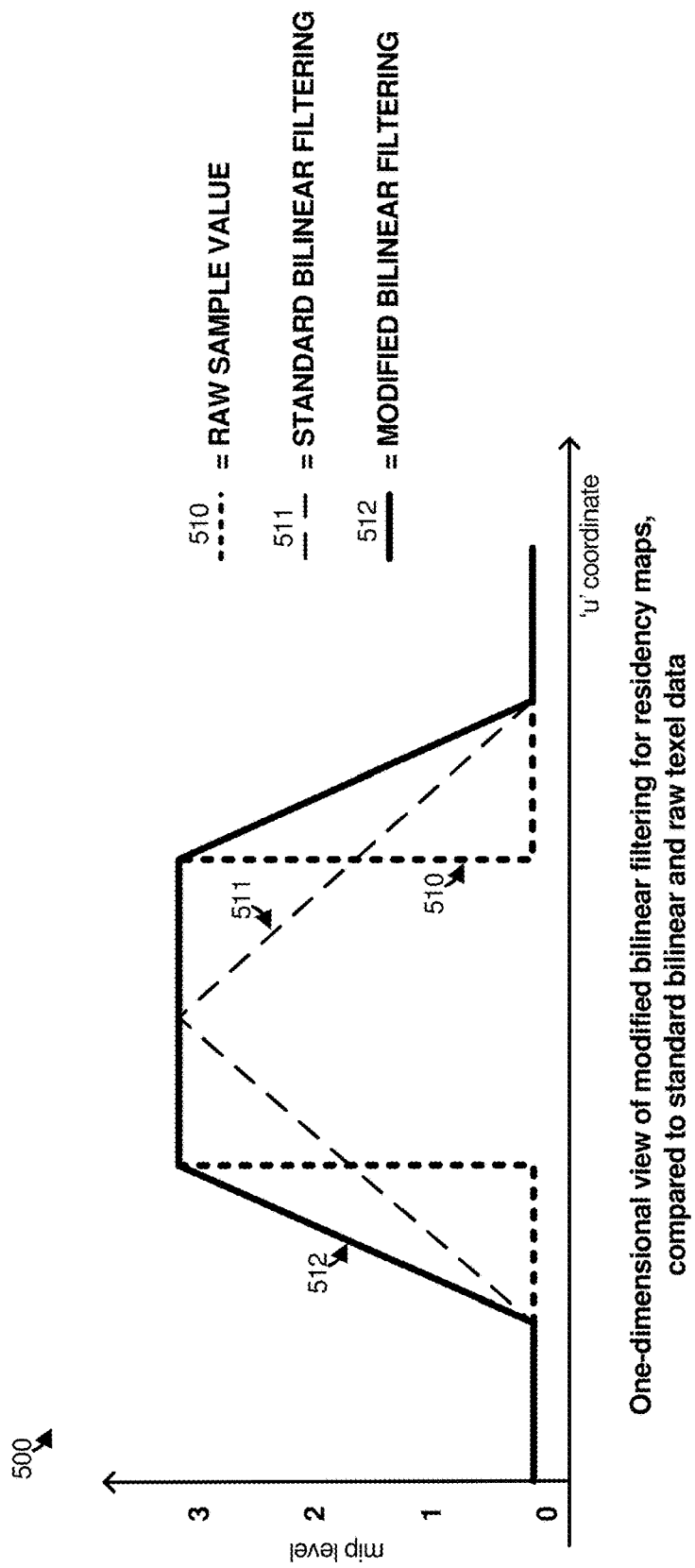
FIG. 5 illustrates an example filtering in an implementation.

FIGS. 4 and 5 are provided to illustrate some examples of the filtering processes with regards to residency map 305. FIG. 4 illustrates bilinear filtering weights adjusted to sharpen the resulting filtered image. Example 401 illustrates raw data for 4×4 texels, example 402 illustrates raw data bilinearly sampled as if it were a 2048×2048 texture, and example 403 illustrates raw data bilinearly sampled as if it were a 2048×2048 texture with bilinear weights adjusted to sharpen filtering.

When filtering the residency map, a modified bilinear filter can be used to sample LOD clamp values. The bilinear weights for filtering adjacent residency map samples are adjustable to simulate the residency map being closer or equivalent to the dimensions of the PRT. Specifically, the filter weights can blend between adjacent residency map samples much closer to the (u,v) space boundaries of the rectangular regions in the PRT. Parameters could be provided in the sampler or descriptor to bias the bilinear lerp threshold by independent powers of 2 in each of U and V directions.

FIG. 5 illustrates a one-dimensional view of modified bilinear filtering for residency maps, compared to standard bilinear and raw texel value/data. Graph 500 illustrates three curves, namely raw sample value 510, standard bilinear filtering 511, and modified bilinear filtering 512. Element 510 can correspond to example 401 in FIG. 4, element 511 can correspond to example 402 in Figure, and element 512 can correspond to example 403 in FIG. 4, although variations are possible.

The filtering linear interpolation (e.g. lerp) value can be modified so that the entire range of the blend between adjacent samples of differing value occurs within the sample of lowest value. For example, if two adjacent residency map samples contained values 0 and 3, the blend from 0 to 1 to 2 to 3 would occur entirely within the region represented by the 0 sample. Once the sampling location crosses the boundary from 0 to 3, the resulting value should be 3.

Figure 6:
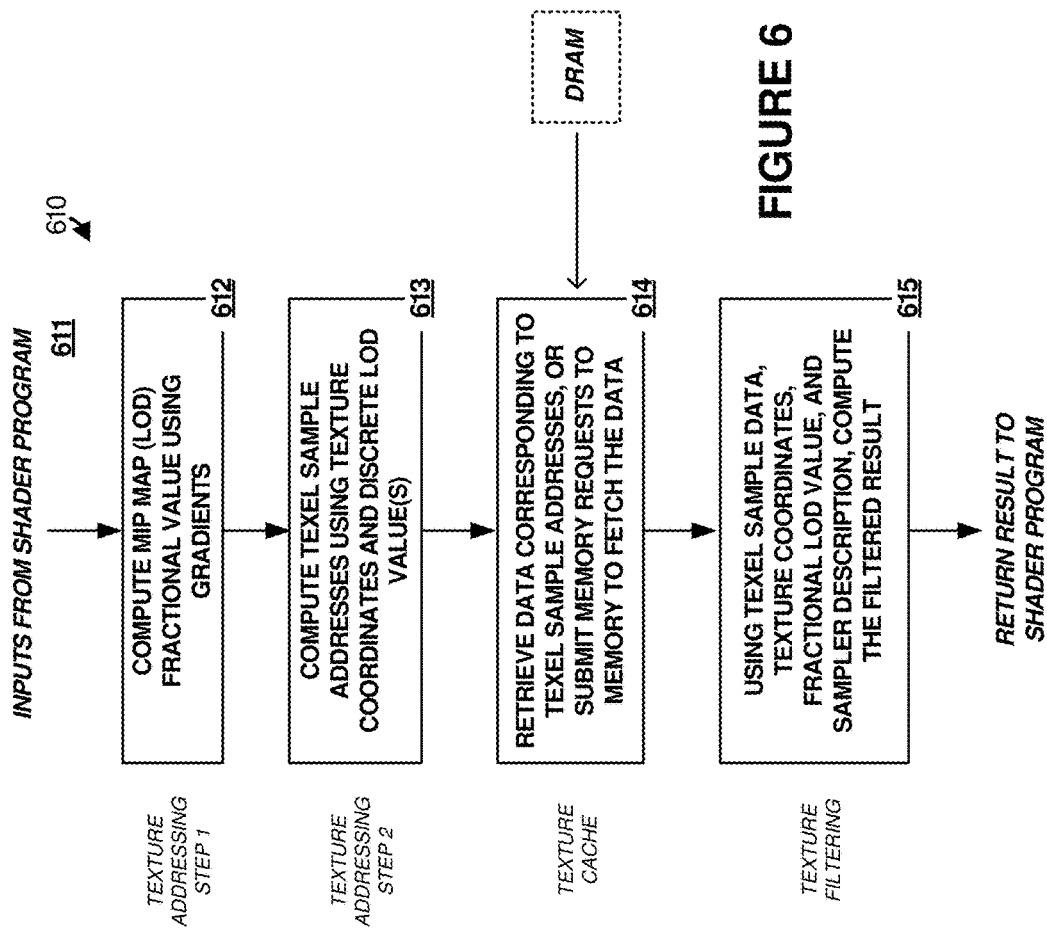
FIG. 6 illustrates a method of operating a graphics processing environment in an implementation.
Figure 7:
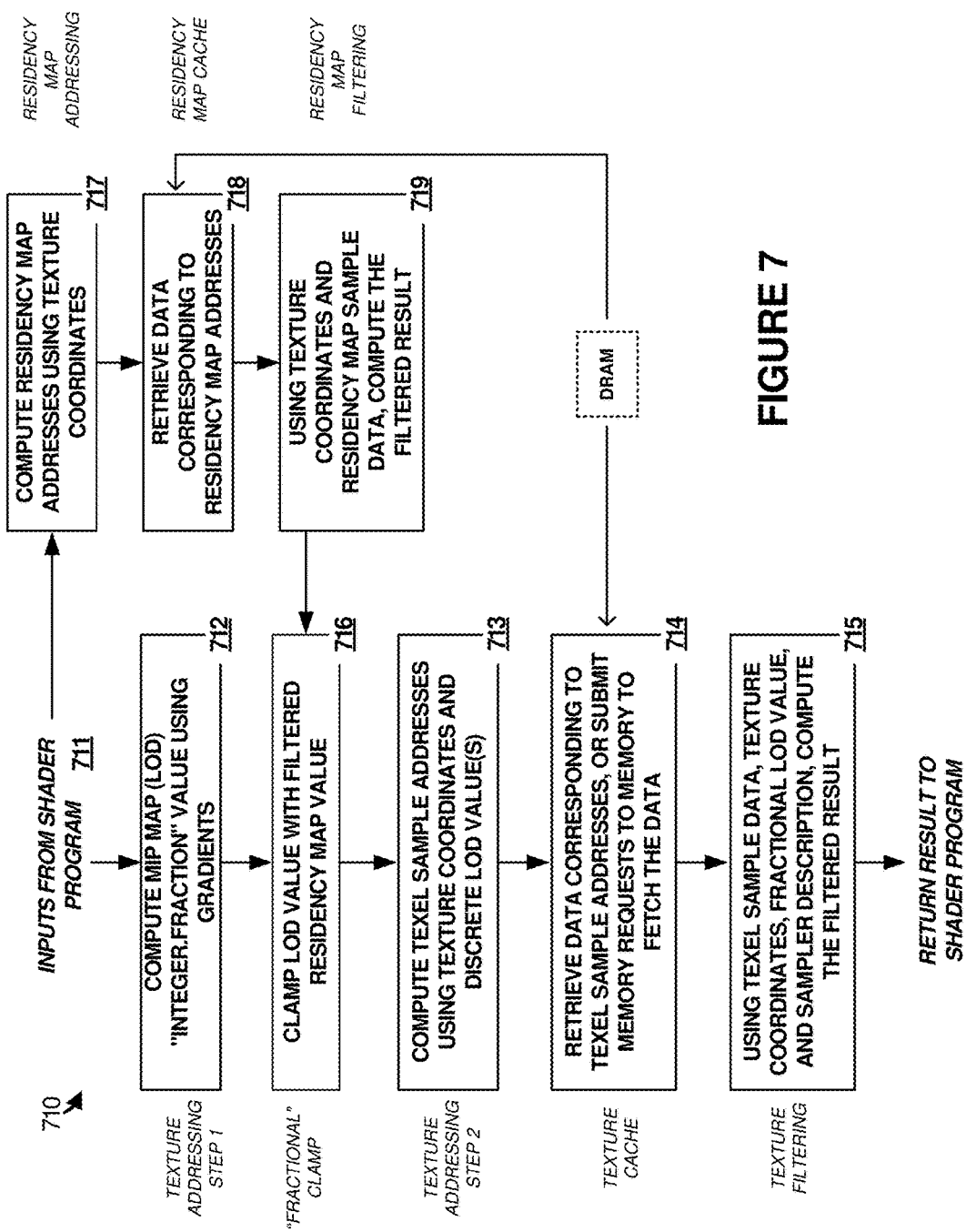
FIG. 7 illustrates a method of operating a graphics processing environment in an implementation.

FIG. 6 and FIG. 7 illustrate example operations of texture mapping processes performed by graphics processing environment 100. FIG. 6 illustrates example process 610 that includes a first example texture sampling pipeline not involving a residency map. FIG. 7 illustrates example process 710 that includes a second example texture sampling pipeline with residency map filtering. The operations of FIG. 6 and FIG. 7 can be performed by portions of a graphics processor or graphics processing unit (GPU), such as graphics processing elements, texture processing elements, texture units, or other elements. In some examples, operations of FIG. 6 and FIG. 7 are performed by portions of graphics processor 220, such as texture unit 263, cache 221, and residency sampler 266, among other elements, including combinations thereof.

In FIG. 6, a typical texture sampling operation consists of the following high-level steps, arranged as a sequential pipeline. In operation 611, texture sampling inputs are received from a shader program, such as (u,v) texture coordinates, texture coordinate gradients, texture descriptions (format/dimensions), and sampler descriptions (texture filtering details). In operation 612, a texture addressing (step 1) is provided. Mip map (LOD) fractional values are computed using gradients. In operation 613, a further texture addressing (step 2) is provided. Texel sample addresses are computed using texture coordinates and discrete LOD value(s). In operation 614, a texture cache operation is provided. Data is retrieved that corresponds to texel sample addresses. In some examples, this data might be retrieved from memory (DRAM) via one or more memory requests. In operation 615, a texture filtering process is provided. Using texel sample data, texture coordinates, fractional LOD values, and sampler descriptions, a filtered result is computing and returned to the shader program.

In FIG. 7, an example process 710 includes further enhanced residency maps and residency sampling operations in a texture sampling pipeline. In FIG. 7, a residency sample operation has a different mode of operation for the texture sampling pipeline than in FIG. 6. In FIG. 7, the residency sample operation is not configured to retrieve texture data. Texture data is not brought into or retrieved from the texture cache, and since no texture data is retrieved, no filtering is performed either. This can ensure that the memory addresses reach the translation lookaside buffer (TLB), which may have a reporting feature that registers all requested memory addresses over a period of time. Residency sampling does not access or use the residency map metadata feature described earlier. LOD clamping applied to the residency map is the traditional clamping specified by the resource descriptor and/or sampler descriptor.

Turning now to the operations of FIG. 7, operation 711, texture sampling inputs are received from a shader program, such as (u,v) texture coordinates, texture coordinate gradients, texture descriptions (format/dimensions), and sampler descriptions (texture filtering details). These texture sampling inputs are then converted into a series of texture sample locations. In operation 712, a texture addressing (step 1) is provided. Mip map (LOD) fractional values (e.g. integer.fraction) are computed using gradients. The texture sample locations are converted to coarse residency map addresses and the LOD for each is looked up and the results filtered.

However, additional operations are provided in FIG. 7 as compared to FIG. 6. First, operation 717 includes a residency map addressing operation that computes residency map addresses using texture coordinates. Operation 718 includes a residency map cache operation that retrieves data corresponding to residency map addresses. This data might be retrieved from memory, such as from dynamic random access memory (DRAM). Operation 719 includes a residency map filtering operation that uses texture coordinates and residency map sample data to compute the filtered result. This filtered result is provided to operation 716 which clamps a LOD fractional value from operation 712 with a filtered residency map value received from operation 719. Then, in operation 713, a further texture addressing (step 2) is provided. Texel sample addresses are computing using texture coordinates and discrete LOD value(s). Texture sampling inputs along with the filtered LOD are converted to linear texture data virtual memory addresses by the "texture addressing" hardware.

In operation 714, a texture cache operation is provided. Data is retrieved that corresponds to texel sample addresses. In some examples, this data might be retrieved from memory (DRAM) via one or more memory requests. Texture addresses are sent out to the texture cache, which consists of the following sub steps (1) virtual to physical address translation via the translation lookaside buffer (TLB) and the GPU page table walker, (2) cache inspection to see if the data at the given address is already in the cache, and (3) memory requests to fetch data into the cache if it is not present.

In operation 715, a texture filtering process is provided. Using texel sample data, texture coordinates, fractional LOD values, and sampler descriptions, a filtered result is computing and returned to the shader program. Texture data retrieved from the cache can be filtered into a resulting output value by the "texture data" hardware.

The residency map sampling includes portions of operation 712 above, namely the texture sample locations are converted to coarse residency map addresses and the LOD for each is looked up and the results filtered. Before texture samples can be generated for the PRT, operation 712 is performed for the residency map. The LOD result from the residency map is used to complete operation 613 for sampling the PRT. If the LOD clamp value obtained from the residency map was insufficient to avoid sampling from nonresident regions of the PRT—i.e. if the residency map values were incorrectly constructed—then existing functionality to handle non-residency in texture filtering would be used. A known value (typically 0) would be used for nonresident samples, and a non-residency failure code could be returned to the shader program if requested.

Figure 8:
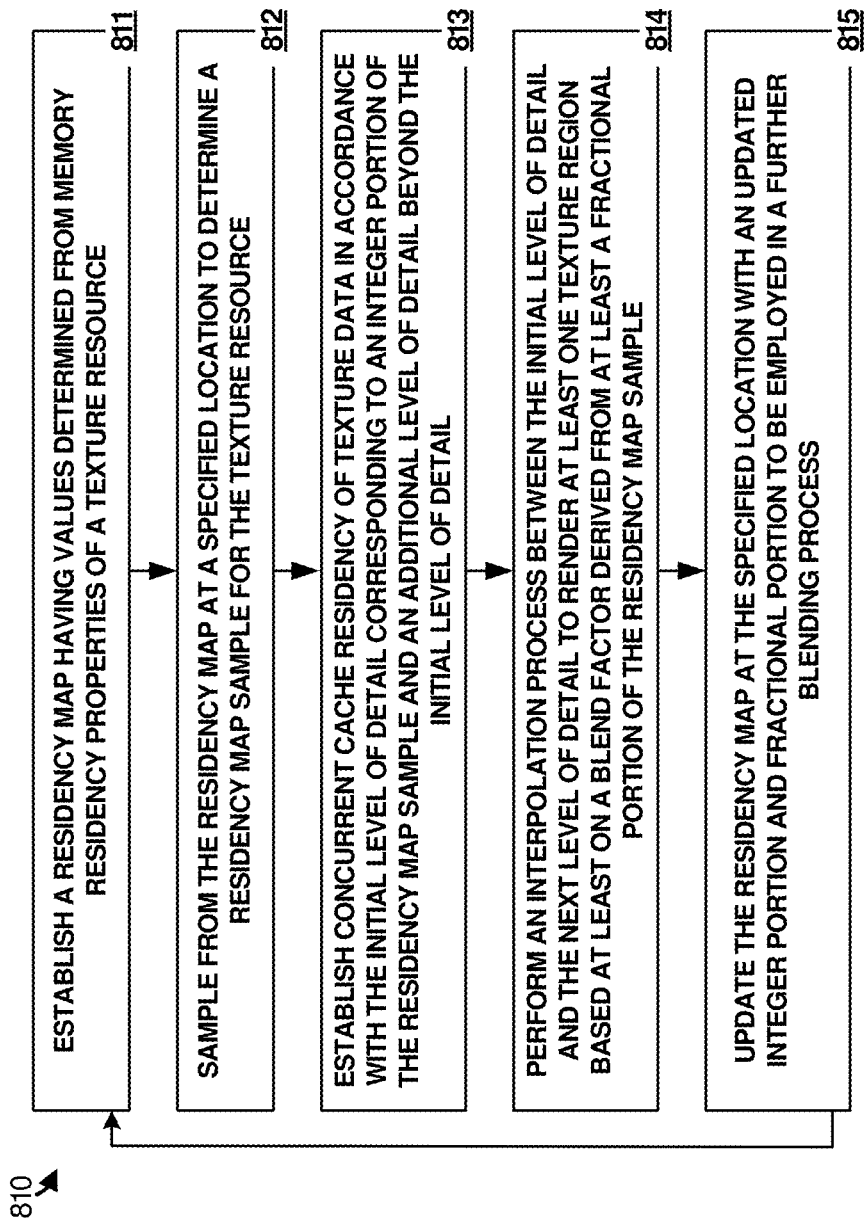
FIG. 8 illustrates a method of operating a graphics processing environment in an implementation.

Turning now to the operations of FIG. 8, another example process 810 includes further enhanced residency maps and residency sampling operations in a texture sampling pipeline. Operations of FIG. 8 are related to elements of FIG. 2, although it should be understood that other components and elements can be applied.

A cache portion, such as cache 221, establishes (811), in a graphics processing unit, a residency map 265 having values determined from memory residency properties of a texture resource. A residency sampler, such as residency sampler 266, samples (812) from the residency map at a specified location to determine a residency map sample for the texture resource at the specified location, where the residency map sample indicates at least an initial level of detail (N) presently resident and a smoothing component or blending factor used in a blending process with a next level (N+1) of detail. In this example, the residency map sample comprises an integer portion and fractional portion. The integer portion represents a lowest level of detail presently resident for the texture resource at the specified location. The fractional portion represents the smoothing component or blending factor used in a blending process between the initial level of detail and the next level of detail. The blending process might be a transition over time between the initial level of detail and the next level of detail, or instead can be a detail blending between the between the initial level of detail and the next level of detail for a single instance of rendering.

A texture unit, such as texture unit 263, establishes (813) cache residency of texture data in accordance with at least the initial level of detail corresponding to the integer portion of the residency map sample and the next level of detail corresponding to the integer portion "plus one" (i.e. N+1). Both the N level and N+1 level have concurrent cache residency in this example. Based at least on the smoothing component of the residency map sample indicated by the fractional portion, the texture unit performs (814) an interpolation process or other blending process between the initial level of detail and the next level of detail to render at least one texture region. In some examples this interpolation comprises a trilinear interpolation between level of detail N and N+1 using the smoothing component or blending factor. The texture unit updates (815) the residency map at the specified location with an updated smoothing component indicated by a fractional value employed in a further interpolation process between further levels of detail. The integer portion can also be updated to transition to a further coarse level of detail.

A further description of a residency feedback loop is now discussed. This residency feedback loop can be implemented by using both residency maps and residency sampling, such as described in FIGS. 7 and 8, the following process can be implemented. First, an application creates a PRT in memory, along with its residency map. At this time, all areas of the PRT are nonresident, and all residency map values are set to the highest possible value (such as 15.9375). The smallest mip level(s) of the PRT are loaded (i.e. mip levels 8 and higher) and made resident in memory, and the residency map is updated to reflect the loaded mip level(s). Now all of the residency map values are set to 8.0. An object in the scene using the PRT is rendered. The PRT is first sampled using the residency map. The values of 8.0 from the residency map are used to clamp the LOD, and the scene renders with mip level 8.0. The PRT is sampled again using the residency sampling feature. The "ideal" LOD is computed as 3.5, and texture addresses are generated for mip levels 3 and 4. The memory requests go only to the TLB/page walker, and are logged by the graphics processor. After the frame completes, the application inspects the log generated by the TLB, and finds that mip levels 3 and 4 were requested for part of the PRT, while only mip level 8 is currently resident for those regions. Texture streaming code in the application begins loading all mip levels for that region up to mip level 3, starting with the smallest (largest index) mip levels first. A portion of mip level 7 is loaded first, and the residency map is updated to contain values of 7.0 in some areas. The application may choose to smoothly fade in mip level 7 over a few frames, writing successive fractional values into the residency map, such as 7.75, 7.5, 7.25, and finally 7.0. Execution repeats at step 3. Over time, more portions of mip levels are loaded in and the loaded state of the PRT gradually approaches the "ideal" LOD calculated by the residency sample. Then, a residency sample operation is performed to record the tiles that would have been required based on the original gradient based LOD.

Figure 9:
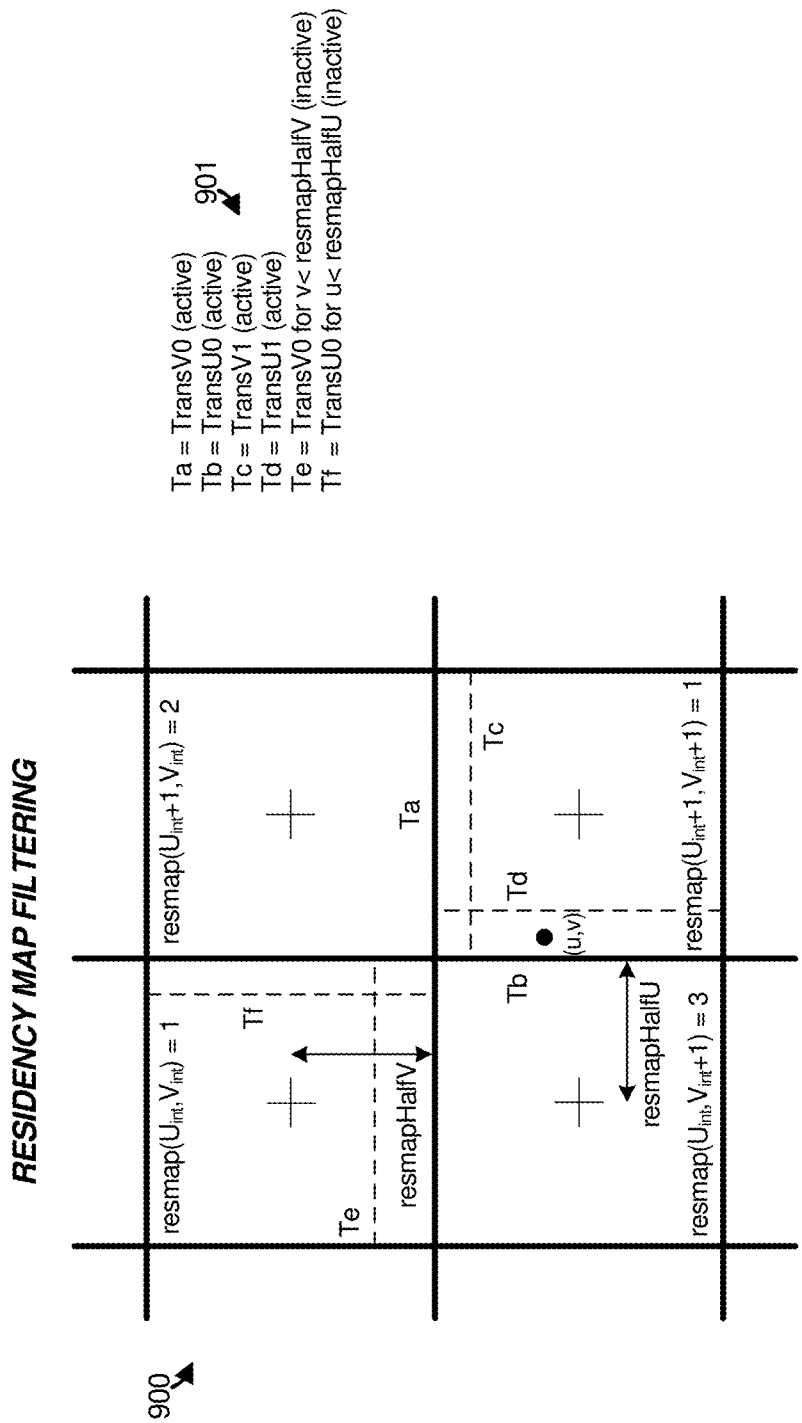
FIG. 9 illustrates an example residency map filtering in an implementation.

To further describe an example residency map ("resmap") filtering process/algorithm, FIG. 9 is provided. The example graph 900 in FIG. 9 corresponds to the following process, with some values listed in key 901. In FIG. 9, a system constant can be established as uvTotalBits which can be set to an example value of 19 to be sufficient for 8K max texture dimension and 1/256 texel precision. Another constant can be established as logRegions which is set to a power of 2 of dimension of the current residency map. Thus, the size of the residency map corresponds to resmap[$2^{logRegionsU}$] [$2^{logRegionsV}$], and can be rectangular. Each pixel shader thread is supplied u,v, and gradientLOD. A half-texel offset is applied because the corner is 0,0 and resmap u,v origin is at (0.5,0.5) in the upper left corner texel. After the offset is applied, the "0.5" value is on the boundary between resmap texels and is dependent on the map resolution. Thus, the following values can be established:
  resMapHalfU=0.5>>logRegionsU
  resMapHalfV=0.5>>logRegionsV
  (umap,vmap)=(u,v)−(resMapHalfU, resMapHalfV)
  fracbitsU=uvTotalBits−logRegionsU
  fracbitsV=uvTotalBits−logRegionsV
  Uint=umap>>(fracbitsU)
  Vint=vmap>>(fracbitsV)
  Ufrac=umap & (2^fracbitsU−1)
    now equal to the distance from left resmap pixel center to right resmap pixel
  Vfrac=vmap & (2^fracbitsV−1)
    now equal to the distance from top resmap pixel to bottom resmap pixel Now the process can look up in the residency map, and the options of clamp and wrap can be applied to all (u,v) below to match actual texture sampler settings.
  resLOD_ul=resmap[uint][vint]
  resLOD_ur=resmap[uint+1][vint]
  resLOD_ll=resmap[uint][vint+1]
  resLOD_lr=resmap[uint+1][vint+1]

Now the process can apply a modified bilinear filter. Separable filtering can be used, and the results of the u-axis and v-axis filters are combined. The process provides a tslope value which is 1/transition distance per LOD difference, e.g. 8 to 64 subdivisions of a map region, which for hardware ease, can be made into a power of two. The tslope value can be provided in a programmable register that controls the resmap filtering function. Which two local resmap texel boundaries are of interest (i.e. that border the transition zones) depends in part on which resmap texel is currently being sampled in, using Ufrac, Vfrac. There are 8 transition zones possible but only two are interesting in this example. In example hardware implementations, boundaries are determined unconditionally. The u-axis transition zone is defined as the range [trans_u0,trans_u1]. The v-axis transition zone is defined as the range [trans_v0, trans_v1].

The process determines final tslopeU and tslopeV for the current resmap as:
  tslopeU=tslope>>logRegionsU
  tslopeV=tslope>>logRegionsV The process sets a transition zone minimum and maximum per-boundary value with the following routine:
  If (resLOD_ul>resLOD_ur)
    Trans_u0=resMapHalfU; Trans_u1=resMapHalfU+(resLOD_ul−resLOD_ur)/tslopeU
    Else if (resLOD_ul<resLOD_ur)
    Trans_u0=resMapHalfU+(resLOD_ul-resLOD_ur)/tslopeU; Trans_u1=resMapHalfU
    Else Trans_u0=Trans_u1=resMapHalfU Repeat similarly for resLOD_ul vs. resLOD_ll to produce trans_v0 and trans_v1 relevant when sampling the residency map within the left two samples. Repeat similarly for resLOD_ll vs. resLOD_lr to produce trans_u0 and trans_u1 relevant when sampling the residency map within the bottom two samples. Repeat similarly for resLOD_ur vs. resLOD_lr to produce trans_v0 and trans_v1 relevant when sampling the residency map within the right two samples.

Now the process determines a per-axis filtered and clamped LOD (LUDu and LUDv) which accounts for whether the resmap (u,v) is inside or outside the transition zone:
  If (Ufrac<Trans_u0)
  LODu=(Vfrac<0.5) ? resLOD_ul: resLOD_ll
  Else if (Ufrac<Trans_u1)
  LODu=tslope(u−Trans0u)+(Vfrac<0.5) ? resLOD_ul: resLOD_ll
  Else LODu=(Vfrac<0.5) ? resLOD_ur: resLOD_lr Repeat for LUDv, then combine to produce the final LOD:
  resLOD=max(LODu, LODv)
  Final LOD=max(gradientLOD, resLOD)
  Sample(u,v,LOD)

Now the process can perform a residency sample operation.

Certain inventive aspects may be appreciated from the foregoing disclosure, of which the following are various examples.

Example 1

A method of handling tiled resources in graphics processing environments, the method comprising establishing, in a graphics processing unit, a residency map having values determined from memory residency properties of a texture resource, and sampling from the residency map at a specified location to determine a residency map sample for the texture resource at the specified location, where the residency map sample indicates at least an initial level of detail presently resident and a fractional portion used in a blending process with a next level of detail.

Example 2

The method of Example 1, where the residency map sample comprises an integer portion and fractional portion, where the integer portion represents a lowest level of detail presently resident for the texture resource at the specified location, and where the fractional portion represents a blending factor for transitioning with the blending process to the next level of detail from the initial level of detail.

Example 3

The method of Examples 1-2, further comprising establishing concurrent cache residency of texture data in accordance with at least the initial level of detail corresponding to the integer portion of the residency map sample and the next level of detail corresponding to an additional level of detail beyond the initial level of detail.

Example 4

The method of Examples 1-3, further comprising based at least on the blending factor indicated by the residency map sample, performing an interpolation process between the initial level of detail and the next level of detail to render at least one texture region.

Example 5

The method of Examples 1-4, further comprising updating the residency map at the specified location with an updated fractional portion indicating a new blending factor employed in a further interpolation process between the initial level of detail and the next level of detail.

Example 6

The method of Examples 1-5, further comprising sampling and filtering at least four nearest samples to the residency map sample to produce a current level of detail in an associated texture resource.

Example 7

The method of Examples 1-6, where the filtering comprises filtering among the four nearest samples according to a dimensional characteristic of the texture resource to produce the current level of detail, the filtering including the initial level of detail clamped based at least upon the fractional portion indicated in the residency map sample.

Example 8

The method of Examples 1-7, further comprising receiving, into a hardware cache of the graphics processing unit, a descriptor comprising a data portion defining the texture resource and a metadata portion defining the residency map with values corresponding to the texture resource.

Example 9

The method of Examples 1-8, where the residency map comprises an array sized proportional to a dimension of the texture resource, and where each location in the residency map corresponds to a 1-byte fixed point value encoding an integer portion indicating the initial level of detail and the fractional portion.

Example 10

A graphics processing unit, comprising a cache portion configured to hold a residency map with values determined from memory residency properties of a texture resource, and a residency sampler configured to sample from a specified location in the residency map to determine a residency map sample for the texture resource at the specified location, where the residency map sample indicates at least an initial level of detail presently resident and a fractional portion used in a blending process with a next level of detail.

Example 11

The graphics processing unit of Example 10, where the residency map sample comprises an integer portion and fractional portion, where the integer portion represents a lowest level of detail presently resident for the texture resource at the specified location, and where the fractional portion represents a blending factor for transitioning with the blending process to the next level of detail from the initial level of detail.

Example 12

The graphics processing unit of Examples 10-11, further comprising a texture unit configured to establish concurrent cache residency of texture data in accordance with at least the initial level of detail corresponding to the integer portion of the residency map sample and the next level of detail corresponding to an additional level of detail beyond the initial level of detail.

Example 13

The graphics processing unit of Examples 10-12, comprising based at least on the blending factor indicated by the residency map sample, the texture unit further configured to perform an interpolation process between the initial level of detail and the next level of detail to render at least one texture region.

Example 14

The graphics processing unit of Examples 10-13, comprising the texture unit further configured to update the residency map at the specified location with an updated fractional portion indicating a new blending factor employed in a further interpolation process between the initial level of detail and the next level of detail.

Example 15

The graphics processing unit of Examples 10-14, comprising the texture unit further configured to sample and filter at least four nearest samples to the residency map sample to produce a current level of detail in an associated texture resource.

Example 16

The graphics processing unit of Examples 10-15, where the filtering comprises filtering among the four nearest samples according to a dimensional characteristic of the texture resource to produce the current level of detail, the filtering including the initial level of detail clamped based at least upon the fractional portion indicated in the residency map sample.

Example 17

The graphics processing unit of Examples 10, comprising the cache portion further configured to receive a descriptor comprising a data portion defining the texture resource and a metadata portion defining the residency map with values corresponding to the texture resource.

Example 18

The graphics processing unit of Examples 10, where the residency map comprises an array sized proportional to a dimension of the texture resource, and where each location in the residency map corresponds to a 1-byte fixed point value encoding an integer portion indicating the initial level of detail and the fractional portion.

Example 19

A method of handling partially resident textures in a graphics processing unit (GPU), the method comprising establishing, in a GPU, a hardware residency map with values indicating residency properties of a texture resource, and sampling from the hardware residency map at specified locations to determine corresponding residency map samples each comprising an integer portion and fractional portion, where the integer portion indicates an associated lowest level of detail presently resident for the texture resource, and where the fractional portion represents an associated smoothing component for transitioning in a blending process with a next level of detail concurrently resident for the texture resource.

Example 20

The method of Example 19, further comprising for at least the specified locations of the hardware residency map, establishing residency of texture data in accordance with lowest levels of detail corresponding to the integer portions of the residency map samples and next levels of details beyond the integer portions. Based at least on the smoothing component of the residency map samples, the method includes performing interpolation processes between the lowest levels of detail and the next levels of detail to render at least one texture region. The method also includes updating the residency map at the specified locations with at least updated smoothing components indicated by the fractional portions to be employed in further interpolation processes.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A method of handling tiled resources in graphics processing environments, the method comprising:
   establishing, in a graphics processing unit, a residency map having values determined from memory residency properties of a texture resource;
   sampling from the residency map at a specified location to determine a residency map sample for the texture resource at the specified location, wherein the residency map sample indicates at least an initial level of detail presently resident and a fractional portion used in a blending process with a next level of detail; and
   updating the residency map at the specified location with updated fractional portions indicating subsequent blending factors used to achieve one or more transition levels between the initial level of detail and the next level of detail.

2. The method of claim 1, wherein the residency map sample comprises an integer portion and fractional portion, wherein the integer portion represents a lowest level of detail presently resident for the texture resource at the specified location, and wherein the fractional portion represents a blending factor for transitioning with the blending process to the next level of detail from the initial level of detail.

3. The method of claim 2, further comprising:
   establishing concurrent cache residency of texture data in accordance with at least the initial level of detail corresponding to the integer portion of the residency map sample and the next level of detail corresponding to an additional level of detail beyond the initial level of detail.

4. The method of claim 3, further comprising:
   based at least on the blending factor indicated by the residency map sample, performing an interpolation process to achieve at least one among the one or more transition levels between the initial level of detail and the next level of detail to render at least one texture region.

5. The method of claim 4, further comprising:
   updating the residency map at the specified location with the updated fractional portions to transition to the next level of detail over time by employing repeated smoothing processes indicated by the fractional portions.

6. The method of claim 1, further comprising:
   sampling and filtering at least four nearest samples to the residency map sample to produce a current level of detail in an associated texture resource.

7. The method of claim 6, wherein the filtering comprises filtering among the four nearest samples according to a dimensional characteristic of the texture resource to produce the current level of detail, the filtering including the initial level of detail clamped based at least upon the fractional portion indicated in the residency map sample.

8. The method of claim 1, further comprising:
receiving, into a hardware cache of the graphics processing unit, a descriptor comprising a data portion defining the texture resource and a metadata portion defining the residency map with values corresponding to the texture resource.

9. The method of claim 1, wherein the residency map comprises an array sized proportional to a dimension of the texture resource, and wherein each location in the residency map corresponds to a 1-byte fixed point value encoding an integer portion indicating the initial level of detail and the fractional portion.

10. A graphics processing unit, comprising:
a cache portion configured to hold a residency map with values determined from memory residency properties of a texture resource;
a residency sampler configured to sample from a specified location in the residency map to determine a residency map sample for the texture resource at the specified location, wherein the residency map sample indicates at least an initial level of detail presently resident and a fractional portion used in a blending process with a next level of detail; and
the residency sampler configured to update the residency map at the specified location with updated fractional portions indicating subsequent blending factors used to achieve one or more transition levels between the initial level of detail and the next level of detail.

11. The graphics processing unit of claim 10, wherein the residency map sample comprises an integer portion and fractional portion, wherein the integer portion represents a lowest level of detail presently resident for the texture resource at the specified location, and wherein the fractional portion represents a blending factor for transitioning with the blending process to the next level of detail from the initial level of detail.

12. The graphics processing unit of claim 11, further comprising:
a texture unit configured to establish concurrent cache residency of texture data in accordance with at least the initial level of detail corresponding to the integer portion of the residency map sample and the next level of detail corresponding to an additional level of detail beyond the initial level of detail.

13. The graphics processing unit of claim 12, comprising:
based at least on the blending factor indicated by the residency map sample, the texture unit further configured to perform an interpolation process to achieve at least one among the one or more transition levels between the initial level of detail and the next level of detail to render at least one texture region.

14. The graphics processing unit of claim 13, comprising:
the texture unit further configured to update the residency map at the specified location with the updated fractional portions to transition to the next level of detail over time by employing repeated smoothing processes indicated by the fractional portions.

15. The graphics processing unit of claim 10, comprising:
the texture unit further configured to sample and filter at least four nearest samples to the residency map sample to produce a current level of detail in an associated texture resource.

16. The graphics processing unit of claim 15, wherein the filtering comprises filtering among the four nearest samples according to a dimensional characteristic of the texture resource to produce the current level of detail, the filtering including the initial level of detail clamped based at least upon the fractional portion indicated in the residency map sample.

17. The graphics processing unit of claim 10, comprising:
the cache portion further configured to receive a descriptor comprising a data portion defining the texture resource and a metadata portion defining the residency map with values corresponding to the texture resource.

18. The graphics processing unit of claim 10, wherein the residency map comprises an array sized proportional to a dimension of the texture resource, and wherein each location in the residency map corresponds to a 1-byte fixed point value encoding an integer portion indicating the initial level of detail and the fractional portion.

19. A method of handling partially resident textures in a graphics processing unit (GPU), the method comprising:
establishing, in a GPU, a hardware residency map with values indicating residency properties of a texture resource;
sampling from the hardware residency map at specified locations to determine corresponding residency map samples each comprising an integer portion and fractional portion, wherein the integer portion indicates an associated lowest level of detail presently resident for the texture resource, and wherein the fractional portion represents an associated smoothing component for transitioning in a blending process with a next level of detail concurrently resident for the texture resource; and
updating the residency map at the specified locations with updated fractional portions indicating subsequent blending factors used to achieve one or more transition levels between the initial level of detail and the next level of detail.

20. The method of claim 19, further comprising:
for at least the specified locations of the hardware residency map, establishing residency of texture data in accordance with lowest levels of detail corresponding to the integer portions of the residency map samples and next levels of details beyond the integer portions;
based at least on the smoothing component of the residency map samples, performing interpolation processes to achieve at least one among the one or more transition levels between the lowest levels of detail and the next levels of detail to render at least one texture region; and
updating the residency map at the specified locations with at least updated smoothing components indicated by the fractional portions to be employed in further interpolation processes.

* * * * *